INVENTOR.
HAROLD E. THOMAS
BY
W. H. Maxwell
AGENT

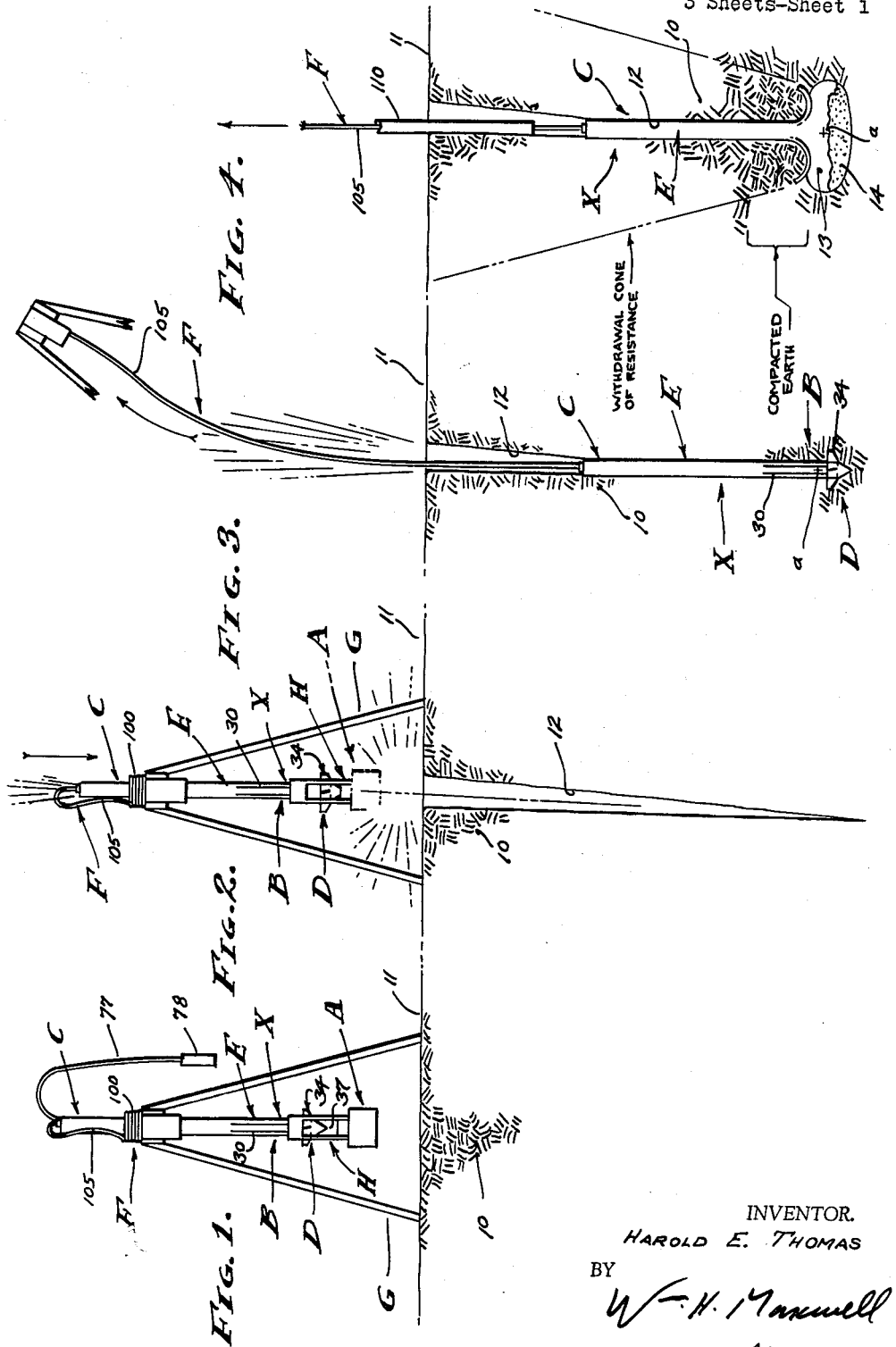

Feb. 8, 1966 H. E. THOMAS 3,233,415
APPARATUS FOR EXPLOSIVELY INSTALLING ANCHORS
Filed Sept. 12, 1962 3 Sheets-Sheet 3
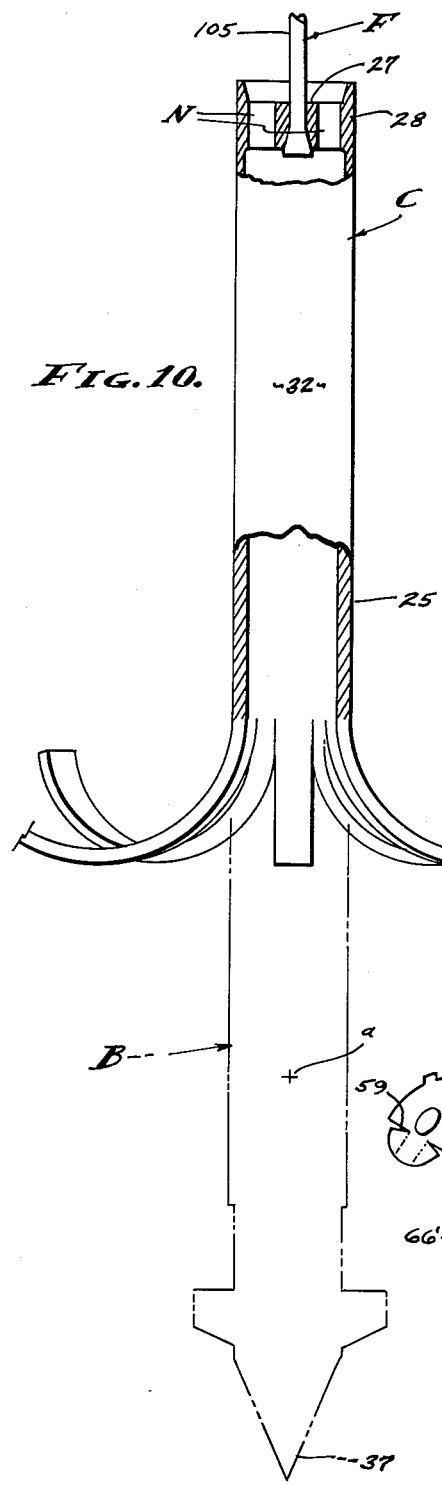
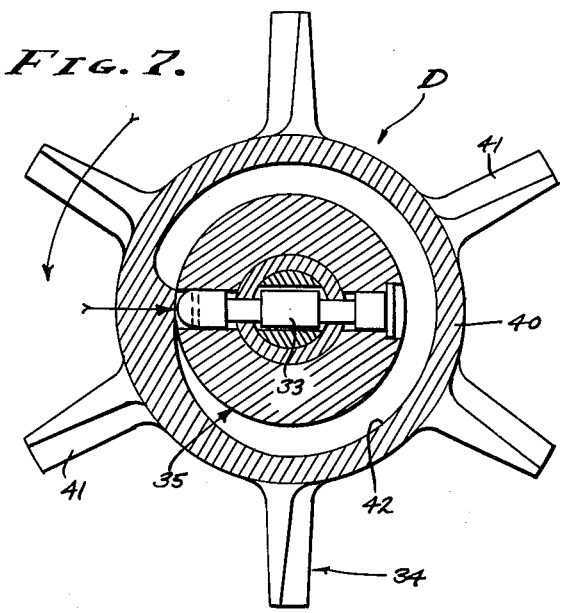
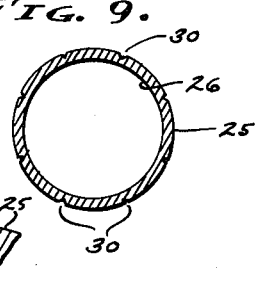
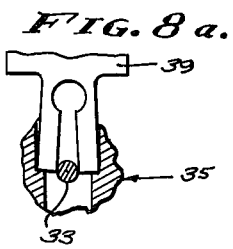
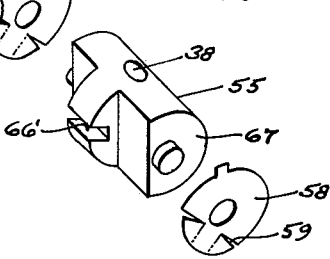
INVENTOR.
HAROLD E. THOMAS
BY
W. H. Maxwell
AGENT United States Patent Office 3,233,415
Patented Feb. 8, 1966

3,233,415
APPARATUS FOR EXPLOSIVELY INSTALLING ANCHORS
Harold E. Thomas, Redondo Beach, Calif., assignor to Harvey Aluminum Incorporated, Torrance, Calif., a corporation of California
Filed Sept. 12, 1962, Ser. No. 223,279
2 Claims. (Cl. 61—53.68)

This invention relates to the installation of ground anchors and is particularly concerned with a method and apparatus utilizing explosive charges for accomplishing the same, it being a general object of this invention to provide an anchor structure for projection to a desired depth in the ground and actuated thereat to expand for engagement with the surrounding earth formation, said projection and actuation being performed with propellant and/or explosive charges.

The anchoring and securement of the equipment in a fixed and safe condition is a requirement in many activities and enterprises. For example, the tie-down requirement for aircraft is many times a critical necessity, due to the relatively light weight of the aircraft and due to the high wind forces encountered when the aircraft is grounded. Also, there are many mobile pieces of equipment which requires securement under certain circumstances, as for example various types of gun mounts and missile launchers. Further, the erection of buildings, either permanent or temporary, require tie-down in many situations. Thus, it is apparent that there are many situations where anchors embedded in and beneath the ground are required, such as guy wire anchors used in the erection of poles or towers, and like structures.

It is an object of this invention to provide a method and apparatus whereby an anchor is installed in the earth, from above the surface thereof, and which is operable entirely by means of propellant and explosive charges to engage the anchor in the earth overlying the same, and without the application of additional overlying bodies or members.

An object of this invention is to provide a method and apparatus for installing an anchor, operable as above set forth without resort to usual preparation procedures which develops a holding power determined by the sum of the weight of earth contained within an overlying inverted cone thereof and of the cohesive resistance or shear strength of the said earth acting on the total peripheral surface area of the said same withdrawal cone.

It is still another object of this invention to provide a relatively small and easily handled apparatus which has utility in being erected over a desired location and operation initiated so as to form a suitable bore in the earth, to be followed by projection of the apparatus to a predetermined depth or position and then actuated, for the purpose of providing a reliable anchor in an extremely short length of time and with the use of minimum manpower.

It is also an object of this invention to provide a method and apparatus whereby a preliminary excavation, a bore, is pre-formed immediately prior to the projection of an anchor into a predetermined position in said excavation or bore.

Further, it is an object of this invention to provide a method and apparatus whereby said preliminary excavation is formed by explosive means, followed by ballistic propulsion of the apparatus into a predetermined position in said excavation or bore.

Still further, it is an object of this invention to provide a method and apparatus whereby the formation of earth surrounding the said excavation or bore is engaged by means of the apparatus to cause actuation thereof at said predetermined depth.

With the foregoing objectives in mind it is also a primary object of this invention to provide a simple and safe device for performing the functions of the method and apparatus herein disclosed and which remains unarmed until deliberately set for operation, after which operation must be deliberately initiated.

The various objects and features of this invention will be fully understood from the following detailed description of the typical preferred form and application thereof, throughout which description reference is made to the accompanying drawings, in which:

FIGS. 1, 2, 3 and 4 are sequential views that show the progressive steps involved in the installation of the anchor, FIG. 1 showing the erection of the apparatus preparatory to the installation of the anchor, FIG. 2 showing the projection of a bore into the earth formation prior to the projection of the apparatus into said bore, FIG. 3 showing the projection of the apparatus into the preformed bore and to a predetermined position therein, and FIG. 4 showing the actuation of the anchoring elements and the manner in which forces are applied after installation of the actuated anchor.

FIG. 7 is an enlarged sectional view taken as indicated by line 7—7 of FIG. 6.

FIG. 8 is a perspective view on one of the parts as it appears removed from the structure.

FIG. 8a is a view showing operation of certain parts and removed from the surrounding structure.

FIG. 9 is a sectional view taken as indicated by line 9—9 of FIG. 6.

FIG. 9a is an enlarged fragmentary view showing the cross section of a typical groove that is used as shown in FIG. 9.

FIG. 10 is a view showing the manner in which the anchoring features are formed as result of the operation and actuation of the apparatus of the present invention.

Figure 6:
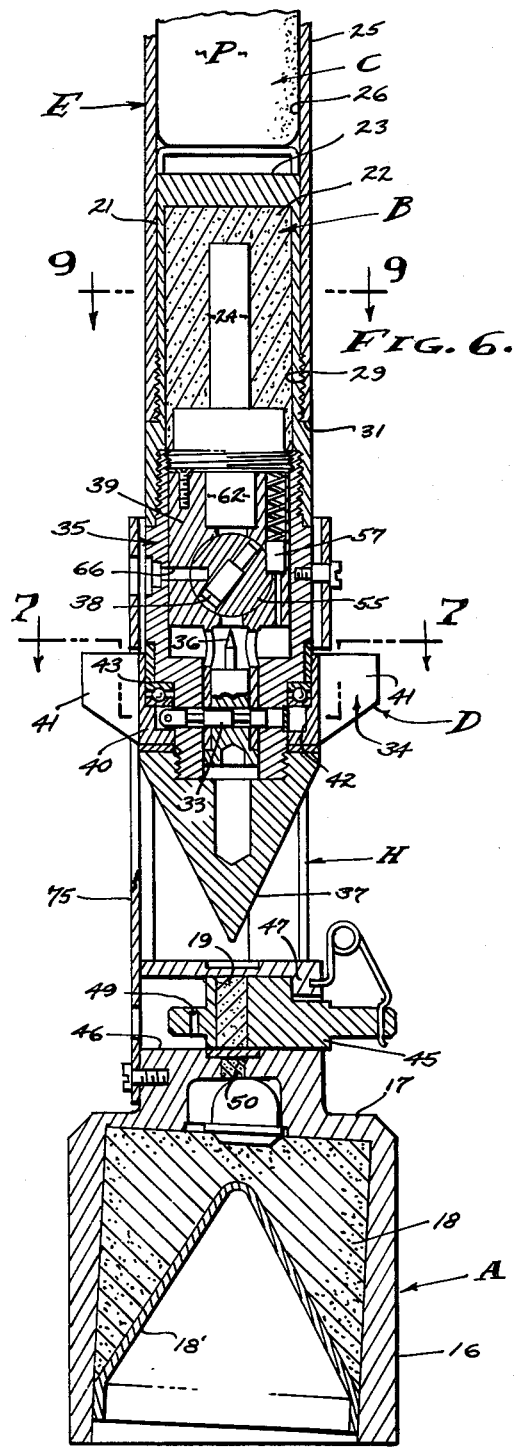
FIG. 6 is an enlarged sectional view taken as indicated by line 6—6 on FIG. 5.

It is well known that differnet earth formations possess different densities and different cohesive properties and weights and strengths. Therefore, experience and factual information can be used in order to determine exactly the holding power of a given anchor design beneath or within a certain body of earth formation. As expressed in the one foregoing objective, the holding power of the anchor installed according to the method and apparatus hereinafter disclosed is the sum of the weight of effective overlying earth, the earth in an overlying inverted cone, and of the shear strength or cohesive resistance of the surface area of said effective earth or cone thereof. Thus, it is apparent that an exacting science is involved in determining said holding power, taking into account different types of earth and how they affect variations as for example in the overlying cone angle, etc.

The method and apparatus of the present invention has utility in all angular dispositions, providing there is sufficient lateral supporting earth formation. Also, the anchor can be installed in the earth formation 10 at any predetermined depth. In the drawings I have shown a vertically disposed installation of the anchor and at an angle normal to the ground surface 11. It is to be understood that the anchor is installed by the preliminary erection of the apparatus at and above the ground surface, at a normal or right angle relative thereto.

The method and apparatus is operated to (1) explosively form a bore 12 in the ground formation, (2) propel apparatus into said bore 12, and (3) explosively to expand and to create a cavity 13, or camouflet, within which the apparatus engages itself well beneath the surface 11.

In accordance with the invention, the finished anchor device is of tubular construction, preferably round in cross-section, with a portion or projection of the anchor device protruding from the surface 11 for engagement with structure to be anchored and/or secured.

Explosives are usable in various ways to dislodge materials in order to form openings of various shapes. For example, it is common practice to drill or bore into earth formation and to insert an explosive charge therein which fractures and loosens the earth when detonated, and in this way a relatively small charge is sufficient. On the other hand, an ordinary explosive charge merely applied to the surface of the ground has little effect, unless it is specially shaped and in which case it can develop extraordinary penetrating power. Further, it is determinable to what extent a certain sized explosive charge will affect a certain surrounding earth formation, when buried in a pre-formed bore in said earth formation. Therefore, the method and apparatus of the present invention employs explosives to form a bore into which a second explosive charge is projected by means of a propellant charge, to the end that apparatus of minimum size and weight is effective to gain maximum results. However, with the method and apparatus as disclosed herein it is not necessary to manually prepare the earth formation in any way nor to manually insert any explosive charge into a bore prior to detonation of said second charge. With the method and apparatus provided, the steps of boring, projection and actuation are all automatically carried out in the proper sequence and in a positive pre-determined manner.

The method provided by the present invention involves, generally, a first step of establishing a bore 12, a second step of projecting an anchor apparatus X into said bore, and a third step of actuating the apparatus when it is properly positioned in the bore. Although a preferred form of apparatus is later described for the specific purpose of carrying out the three general steps of this method it is to be understood that various forms of apparatus may be employed without deviating from the scope of the method involved. That is, each step may be carried out separately, for example, and not necessarily with a particular unitized apparatus wherein the elements combine to operate in combination and jointly, all as later described.

In accordance with the method, the first step of establishing a bore, for instance a bore 12 in earth formation 10, is accomplished by means of an explosive "shaped-charge," later described. Said "shaped-charge" is positioned at and faces toward the surface 11 of the earth formation 10 and is preferably spaced a short distance away from said surface 11 (see FIG. 1 and 5). When the "shaped-charge" is detonated, the blast thereof is focused to penetrate through the earth formation 10 a substantial distance creating the bore 12 which is, in actual practice, a slender elongate pencil-shaped opening in the earth formation 10, and in the nature of a pilot hole (see FIG. 2).

The second and intermediate step of projecting an anchor apparatus X into the bore 12 is accomplished ballistically by means of thrust resulting from the ignition of a propellant charge, or rocket type motor. In other words, the propellant charge (later described) drives the anchor apparatus X into the bore 12 and into the earth formation 10 well beneath the surface 11 thereof (see FIG. 3).

The third and final step of actuating the anchor apparatus X is carried out after said apparatus has reached a proper operating position within the earth formation 10. The proper actuating or operating position is indicated at a in FIGS. 3, 4 and 10, in which position the apparatus X is operated to expand and to establish a cavity 13 in the earth formation 10. As shown, the apparatus X is buried a substantial distance into the earth formation 10 following the direction of the bore 12. In said buried position an explosive means D of limited and predetermined power is detonated and as a result a cavity 13, or camouflet, is formed well below the surface 11 and without disturbing the surrounding and overlying earth formation between the cavity 13 and the surface 11. The cavity 13 is toroidal or spheroidal in configuration (a flattened sphere as shown in FIG. 4) as determined by the ring shape of the explosive charge later described.

It will be apparent how detonation of the limited explosive charge D fractures a limited area of material in the surrounding earth formation 10 to establish the cavity 13 therein. A substantial amount of said earthen material will be disintegrated by detonation of the explosion charge D and loosened material will fall back into the cavity 13 as indicated at 14. The exact effect of the explosion will depend upon the properties of the particular earth formation involved and upon the condition thereof, but in any case the general result is the same. That is, a cavity 13 will be formed, and a certain amount of material 14 will fall back into the cavity or remain at the bottom thereof.

Figure 5:
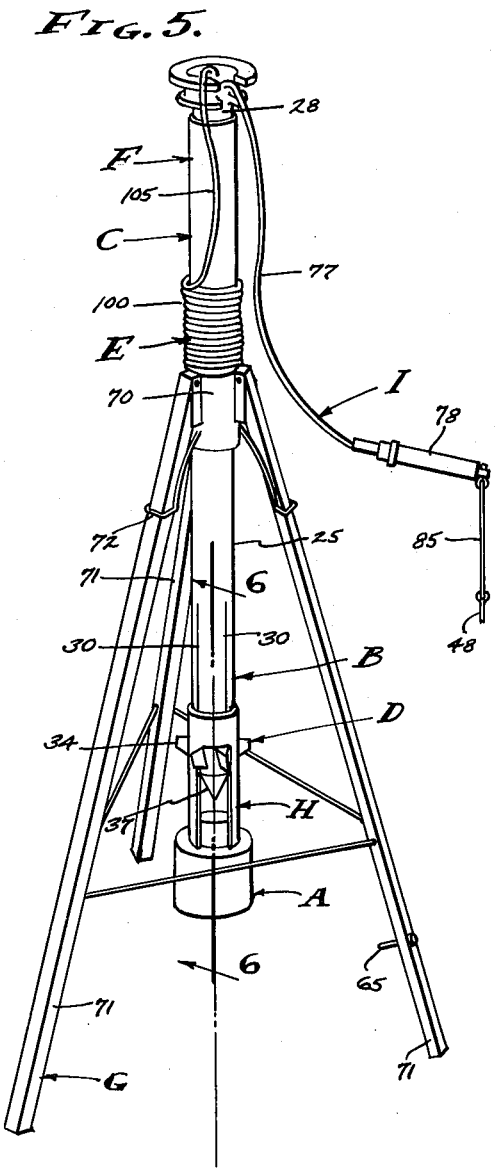
FIG. 5 is a perspective view of the erected apparatus that is shown in FIG. 1.

In accordance with the method there is provided apparatus X adapted to be collapsed for handling and transporting and adapted to be erected for operation and use. As best illustrated in FIG. 5 of the drawings, the apparatus X involves, generally, a boring means A, an explosive charge B, driving means C to project the apparatus with its charge B into the bore 12 created by the means A, and detonating means D to set off the charge B at a predetermined position in the bore 12. In addition, the apparatus includes a body E and coupling means F. Also included are safety means for the boring means A, safety means for the explosive charge B, a standard G for erecting the entire apparatus, a support H for the boring means A, and igniting means I to initiate operation of the apparatus.

The boring means A is provided to carry out the first step of the method and involves a "shaped-charge" of explosive. The structure of the present invention is constructed along a longitudinal axis that will be referred to as a central vertical axis since the particular apparatus under consideration will ordinarily be employed upon a substantially horizontal surface. The means A is placed to occur on the central axis of the structure and is spaced above the surface 11 when in working position. The means A involves a shell 16 of cylindrical shape closed at its top 17 and open at its bottom. A jet cartridge 18 is carried in the shell 16, said cartridge having a cylindrical outer wall, a flat top wall, and an inverted cone-shaped bottom wall. A retainer 18′ is pressed into the shell 16 and has a conical wall conforming to the shape of the bottom wall of the cartridge 18. A jet cartridge booster 20 is carried in the shell 16 adjacent the top of the cartridge 18 to detonate it, as later described. The cartridge 18 is set off by a detonator 19 that is carried and positioned by a safety means. Further, the axis of the cartridge 18 is angularly related to the central axis of the structure to insure operation of the detonating means D, as later described. For example, it is canted at an angle of about 3½°.

The explosive charge B is provided to be projected into the bore 12 in accordance with the second step of the method and involves a high explosive charge. The explosive charge B is placed to occur above the boring means A on the central axis of the structure and is spaced somewhat from the means A. The explosive charge B involves a case 21 of cylindrical shape that carries an explosive load 22. The case 21 is closed at its upper end 23 and open at its bottom, being threaded onto the detonating means D. The load 22 occupies the interior of the case and surrounds a detonator 24 that is carried by and projects from the detonating means to detonate the load 22, as later described.

The body E lends the tubular characteristic to the device and is deformable and such as to be worked from a pre-formed condition into an actuated and expanded condition. The coupling means F extends from the body E and remains unaltered, being flexible and subject to subsequent manipulation for applying seating forces to the expanded body. And, the explosive charge B is the operative element of the device which causes actuation of the anchor body E from the condition shown in FIGS. 1–3 to the condition shown in FIGS. 4 and 10.

The body E that is deformable from its initially pre-formed condition will be described in the said pre-formed condition. As shown in FIGS. 5 and 9 the body E is an elongate cylindrical tube of metal having substantial wall thickness. Therefore, the body E has an outside diameter 25 to freely pass into the bore 12, and it has an inside diameter 26 concentric with the outside diameter. The lower, otherwise open, end of the body A is closed by the case 21 of the explosive charge B having a concentric bore 29 threaded onto the case 21. Thus, the case 21 forms a closure at the lower end of the body E. The upper, otherwise open, end of the body E has a head 28 also having a concentric boss 27 accessible from the uppermost end of the apparatus. Thus, the body E is a tubular element closed at its bottom and opened at its top with head 28 having a boss 27 for the reception of coupling means F on the central axis of said body.

The characteristic feature of the present invention is the weakening of the body E in a direction longitudinally thereof, in a plurality of planes of weakness provided thereby and along which the tubular wall of the body will split and/or divide under the influence of the operation of explosive charge B. As shown, equally and circumferentially spaced channels or grooves 30 extend longitudinally of the body E, said grooves being narrow and of a relatively shallow depth. It is also preferred that said grooves of weakening be cut inwardly from the outer diameter 25. In accordance with the invention the grooves 30 extend downwardly from the intermediate portion E of the body E to the lower end 31 thereof. The lower end portion of body E is telescoped over the body 21 with the lower end 31 thereof seated on a part of the detonating means D from which said body 21 projects. The said grooves 30 gently merge with the outside diameter 25 at a position substantially above the lower end of the body. Thus, the entire upper portion 32 remains intact for permanent joinder with the head 28 above described.

The driving means C is provided to project the apparatus X with its charge B into the bore 12, in accordance with the second step of the method, and preferably involves a rocket type thrust motor. The driving means C, as illustrated in the drawings, involves the body E of cylindrical shape that contains a propellant P. In practice, the body E is a continuation of the means D and case 21 of the explosive charge B and is a slender elongate element with the head 28 at its top. Venturi-shaped nozzles N are provided in the head 28 to handle the exhaust blast of the propellant P when it is ignited, and said nozzles are formed concentrically around the boss 27, as best illustrated in FIG. 10.

The detonating means D is provided to set off the explosive charge B in accordance with the third step of the method and operates to set off the charge B only after said charge has reached a predetermined position in the bore 12. It is to be understood that the means D may be varied as circumstances require and may be any suitable mechanism responsive to movement or positioning of the explosive charge B. The particular detonating means illustrated in the drawings is in the nature of a fuze and is best illustrated in FIGS. 6 and 7. As shown, the fuze type detonating means D involves a head 35, a firing pin 36, a sear 33 and an actuator 34. The head 35 houses and carries the elements of the detonating means D and also the elements of safety means later described.

The head 35 is a continuation of the lower end of the case 21 and depends therefrom to carry a pointed tip 37 adapted to have piercing action for purposes later described. The firing pin 36 is seated in the head 35 to face upwardly along the central axis and has a pointed upper end adapted to strike a detonator 38 that is carried and positioned by safety means. A fuze body 39 is shiftably carried within the head 35 to move longiutdinally of the head from a normally unactuated position, as shown throughout the drawings, to a position where the detonator 38 strikes the firing pin 36. As clearly shown in FIG. 6, the fuze body 39 is a cylindrical part that incorporates safety means for positioning the detonator 38 (shown safetied) and it has a depending stem that is passed through a bore in the lower end portion of the head 35. The said stem is tubular in form and accommodates the firing pin 36 so that the pin is slidable within the stem. As shown in FIG. 8a the stem of body 39 is split or bifurcated so that it can be spread laterally by the sear 33, and in accordance with the invention, the bore in the head 35 that passes the stem is provided with an upwardly faced shoulder to have supporting engagement with the bottom of the stem. As shown, the stem of body 39 has a flat end face that spreads diametrically outwardly to seat upon the said supporting shoulder.

The sear 33 is a shiftable element that operates transversely of the head 35 and firing pin 36, and it is a spool-shaped element with an enlarged central portion and with spaced reduced portions adjacent each end of the central portion. The sear 33 is round in cross-section and extends through an opening that passes transversely through the pin 36 to hold the pin in operation position. When the central portion of the sear is offset as shown in FIG. 6 the enlarged portion of the firing pin 36 engages the bifurcation of the stem body to spread the stem for supporting engagement. When the central portion of pin 36 is shifted to occur centrally of the structure as shown in FIG. 7 the stem is allowed to constrict for release from the head and downwardly relatively to strike the cap 38 against the firing pin 32.

A feature of the present invention is the actuator 34 provided to release the sear 33 only after the apparatus X and said explosive charge B has reached a predetermined position in the bore 12. The head 35 is carried at the lower end of the assembly and the actuator 34 involves a ring-shaped element characterized by a sleeve 40, vanes 41 and by a cam 42. The element forming the actuator 34 is rotatably carried by the head 35, the sleeve 40 being an annular part occupying a correspondingly shaped recess in the head. In practice, the head 35 has a reduced portion forming the recess, and the tip is secured to the said reduced portion, preferably by a threaded connection, to retain the sleeve 40 in working position. Since the substantial axial thrust is applied to the sleeve 40 under operating conditons, there is provided a bearing 43, preferably an anti-friction ball bearing unit that rotatably supports the sleeve 40 and which is designed to receive upwardly directed axial forces. As shown, the bearing 43 has an upper race seated in the head 35, a lower race carrying the sleeve 40 and ball bearings intermediate the races.

One or more vanes 41, preferably a plurality of vanes, for example six vanes, project radially from the periphery of the sleeve 40 in order to engage in the earth formation 10. That is, the vanes 41 are adapted to engage with the wall of the bore 12 as the assembly of parts enters into said bore. As clearly illustrated, the vanes 41 are flat longitudinally disposed fin-shaped parts suitably pitched or inclined in helical planes so as to have a screw action within the earth formation 10. In practice, the vanes are pitched to rotate the sleeve 40 counter clockwise when the actuator 34 is advanced downwardly toward the proper firing position.

The cam 42 of the actuator 34 is a circular cam formed in the inner wall of the sleeve 40 and involves an involutely curved wall (see FIG. 7) that extends circumferentially and which engages one end of the sear 33 to shift the sear to the above mentioned central position when the sleeve 40 is rotated. A light shear pin (dotted line at left in FIG. 7) assures that the sear 33 remains in a safe position until operation of the actuator 34. The relationship of elements is such that the sear 33 is centrally positioned upon turning of the sleeve 40 caused by the forward and downward movement of the means D and consequent turning of the actuator 34 a predetermined amount, as indicated.

The safety means E is provided to unarm the boring means A, above described, and involves a shiftable carrier 45 to position the detonator 19 that is struck to set off the cartridge 18. In the preferred form of the invention the carrier 45 is a slide that operates transversely of the top 17 of the shell 16, said carrier being shiftably supported in an opening 46 that overlies the jet cartridge 18. A leg of the standard S normally holds the slide in a safe position, and there is a stop 47 that positions the slide, as shown in FIG. 6, so that the detonator 19 is aligned with the cartridge 18. There is a cotter 48, as shown in FIG. 5, that is engaged in an opening 49 is the slide to normally hold the slide in an unarmed position with the cap 19 substantially offset from the cartridge 18 and a spring normally yieldingly urges the carrier 45 into engagement with the stop 47. In practice, a central passage 50 extends between the detonator 19 and jet cartridge 18 when the slide carrier 45 is in the armed position. Further, the top 17 of the shell 16 is provided with a relatively thin wall that normally protects the detonator 19 but which is frangible when struck to set off the said detonator.

The safety means F is provided to unarm the explosive charge B, above described, and involves a shiftable carrier 55 to position the detonator 38 that is struck by the firing pin 36 to set off the booster 24. In the preferred form of the invention the carrier 55 is a rotary element that is unbalanced to operate by means of inertial forces to move the detonator 38 into alignment with the firing pin 36 and booster 24 only when the structure is accelerated by the driving means C. As shown, the carrier 55 is a cylindrical part with an opening extending diametrically therethrough to carry the detonator 38. A spring biased weight 57 normally presses against a ratchet tooth at the periphery of the carrier to hold it in the unarmed position, wherein the detonator 38 is out of alignment with the central axis of the structure (see FIG. 6). However, the carrier is weighted at 67 (see FIG. 8) so that when the structure is accelerated downwardly and forwardly the carrier is rotated and wherein the detonator 38 is in alignment with the central axis of the structure. Further, during acceleration the weight 57 is retracted to allow the carrier 55 to turn. In FIG. 8 there is shown suitable spring elements in the form of plates 58 that provide the necessary frictional resistance for ordinary handling shocks, and that provide stops 59 to limit rotation of the carrier and to lock it in the aligned position. When the carrier 55 is in the armed position, the opening communicates with the firing pin 36 through an opening and with the booster 24 through another opening. In practice, an intermediate lead charge 62 is carried in the latter opening.

In carrying out the invention, means is provided to assure that the carrier 55 remains in the unarmed position while the apparatus is collapsed and in storage. This means is in the form of a lock pin 65 that is projected through an opening 66 in the head 35 to engage in a notch at 66′ in the carrier 55, said pin 65 being shown removed in FIG. 5 of the drawings. When the pin 65 is engaged in the notch at 67 the carrier 55 is locked unarmed.

The standard G is provided to support the above described mechanisms in an erected working position such as shown in FIGS. 1 and 2. The standard G is collapsible and is such as to be easily and quickly manipulated to carry the operative elements of the apparatus. As shown, the standard G involves a collar 70 sidably carried over the body E housing the driving means C, legs 71 pivoted to the collar 70, and positioning means 72. The collar 70 is a simple tubular element with outwardly projecting ears to carry the legs 71. The legs 71 are secured to the ears by pins, there being three legs in the preferred form of the invention. The positioning means 72 involves a spring element at each leg and which is anchored to the leg and biased inwardly to engage the body E. The spring normally yieldingly urges the leg 71 outwardly and retains the collar 70 frictionally engaged in the supporting position. It will be apparent that the collar 70 is operable from the upper end of the body E to the lower end thereof connected to case 21.

The support H is provided to carry the boring means A in operative position relative to the apparatus X that is to be projected into the bore 12 and is in the nature of a coupling element that joins the boring means A to the explosive charge B. In practice, the head 35 depends from the case 21 of the charge B and the support H is in the form of a sleeve 75 that surrounds the head 35 and extends forwardly and downwardly over the tip to have supporting engagement with the shell 16 of the means A. Suitably spaced screw fasteners, or the like, secure the sleeve 75 to the head 35, preferably spaced therefrom leaving an annular gap between the head and sleeve. The said screw fasteners are shear elements designed to fail at a predetermined load or pressure. Similarly, ordinary screw fasteners secure the top 17 of the shell 16 to the sleeve leaving some distance between the vertex of the tip 35 and the frangible wall that protects the cap 19.

The igniting means I is provided to set off the apparatus of the present invention and forms a closure that protects the propellant P of the driving means C. Any suitable device may be employed for ignition of the propellant P and in the drawings there is illustrated a conventional igniting means involving a safety fuze 77, and an operator 78 connected to a detonating charge (not shown) adapted to ignite the propellant. The operator 78 is manually actuated by withdrawing a cotter pin therefrom (see FIG. 5) to activate the safety fuze. In any case, a time interval is established by the operator 78 between the moment of manual actuation and the moment of detonation, during which time interval a person can remove himself to a safe distance. With the legs 71 collapsed, the lock pin 65 remains engaged with the carrier 55 to unarm the explosive charge B, and the cotter 48 remains engaged in the opening 49 to secure the slide carrier 45 to unarm the "shaped-charge" of the means A. In accordance with the safety features of the present invention, a lanyard 85 extends from the operator 78 to the cotter 48 so that by ordinary manipulation of the operator the cotter 48 is removed from the carrier 45. As above mentioned, the lock pin 65 is normally engaged with the carrier 55 and it is retracted to arm the charge B only when the leg 71 carrying the pin 65 is moved to an erecting position. Thus, the apparatus is automatically armed as it is erected as shown in FIG. 1.

The coupling means F extends from the body E and is a straight elongate rod-like element of cylindrical cross-section and of limited diameter. Thus, a substantial annulus is left remaining and surrounding the rod-like coupling element and within the walls of bore 12. The lower end portion of the coupling element is fastened into the boss 27 at the upper end of body E. It is preferred that the said coupling element be in the form of a light flexible line or cable 105 suitably coiled and supported on the apparatus, as at 100, and adapted to follow the body E into the bore 12. The upper end portion of the coupling is adapted to be coupled to the structure to be anchored, or it is adapted to act as a guide to direct a larger diameter tubular rod 110 into threaded engagement with the boss 27 so as to form an extension of the body E. The lower end of such a rod 110 seats on the upper face of the head 28. In practice, the rod 110 is threaded onto the boss 27 and is a straight element of considerable length, whereby the anchor apparatus can be inserted deeply into the bore 12. The uppermost end portion of the coupling element, cable 105 or rod projects above the ground surface 11 for suitable manipulation.

From the foregoing the complete structure of the anchor device will be understood. In operation, the anchor apparatus X in the form of a complete assemblage is erected as thus far described and operation thereof is initiated by manual actuation of the igniting means I that times the ignition of the propellant P of the driving means C. Upon detonation and ignition the propellant P acts to discharge gases through the nozzles N to create thrust for moving the elements of the apparatus X downwardly and forwardly. In practice, the initial thrust is substantial and sudden with the result that the charge B and detonating means D, and associated elements, are accelerated rapidly. In accordance with the invention, the shear screws at the sleeve 75 of the support H are structurally weak and fail in order to allow the tip to be guided by the sleeve 75 to advance into engagement with the detonator 19 to set off and detonate the "shaped-charge" of means A, the inertia of the elements of means A being sufficient to hold said means A in position, momentarily.

With the detonation of the boring means A the bore 12 is formed in the earth formation 10 and on an axis canted relative to the central axis of the apparatus. The elements of the means A and H are fabricated of frangible materials that disintegrate from the forces of the blast of means A whereby there is no obstruction in the downward path of the explosive charge B. With the combination of the propellant P well under way the driving means C and charge B are projected with accelerated force into the bore 12 established ahead thereof whereupon the vanes 41 operate in the earth formation, which action is assured by canting the bore 12, to rotate the sleeve 40 to release the fuze body, all as above described. As the charge B and safety means F are accelerated the carrier 55 is rotated by inertial forces as above described so that the charge B is armed for detonation when the proper firing position is reached below and beyond the surface 11 and well within the earth formation 10. Upon reaching the lower end portion of the bore 12, the moving structure is decelerated rapidly by means of frictional engagement with the earth formation 10. Thus, the fuze body 39 carries the detonator 38 forcefully into engagement with the firing pin 36, all to the end that the explosive charge B is set off at the point A, as above set forth.

The explosive charge B is thereby detonated at *a* and causes the anchor body E to split and/or divide along the plurality of grooves 30. As a result the separated peripheral portions of the body E expand outwardly forming a plurality of arcuate upwardly turned tangs substantially as indicated in FIGS. 4 and 10. Simultaneously with said explosion and expansion of the body E to form the tangs, above referred to, the force of the explosive charge B establishes the cavity 13, or camouflet, surrounding the lower end portion of the body E, shown as indicated in FIG. 4. Considerable upward axial force is exerted by the explosion, causing the body E and tangs thereof to be driven upwardly and inbedded in the earth formation.

In order to set the anchor apparatus X for final use, upward force is applied to the cable 105 or rod 110, as the case may be, by any convenient means, such as by means of a screw or jack, causing the expanded body E, or tangs thereof, to engage forcibly and bite into the overlying earth formation, the roof portion of the cavity 13, as indicated in FIG. 4. This seating action of the body E, or tangs thereof, causes the earth immediately within the area enclosed by the angularly related tangs to become consolidated and/or compacted, establishing a solid base beneath the overlying undisturbed earth. The said overlying undisturbed earth establishes the inverted anchoring cone of earth formation, as described and set forth above.

Having described only a typical preferred form and application of my invention, I do not wish to be limited or restricted to the specific details herein set forth, but wish to reserve to myself any modifications or variations that may appear to those skilled in the art and fall within the scope of the following claims:

Having described my invention, I claim:

1. Apparatus for explosive installation of an anchor beneath ground surface comprising in combination
   shaped explosive charge means,
   means for supporting the shaped explosive charge means contiguous with ground surface,
   anchor means including a deformably distensible body portion,
   a second explosive charge carried within the deformably distensible body portion of the anchor means,
   means for exploding the shaped explosive charge means to establish an elongated bore extending below ground surface,
   means for projecting the anchor means into the elongated bore, and
   means carried by the anchor means including rotatable actuator means engageable with sidewalls of the elongated bore and operable to detonate the second explosive charge distending the body into anchoring engagement below ground surface.

2. Apparatus for explosive installation of an anchor below ground surface comprising in combination
   shaped explosive charge means,
   means for supporting the shaped explosive charge means contiguous with ground surface,
   anchor means having a sidewall including a deformably distensible body portion,
   a second explosive charge carried within the deformably distensible body portion of the anchor means,
   means for exploding the shaped explosive charge means to establish an elongated bore extending beneath ground surface,
   means for projecting the anchor means into the elongated bore, and
   means mounted on the anchor means sidewall for detonating the second explosive charge to distend the body into anchoring engagement below ground surface.

References Cited by the Examiner

UNITED STATES PATENTS

| | | | |
|---|---|---|---|
| 1,661,091 | 2/1928 | Riabouchinski | 89—1.7 |
| 2,269,646 | 1/1942 | Burke. | |
| 2,408,419 | 10/1946 | Foster | 89—1 |
| 2,601,522 | 6/1952 | Heiland et al. | 102—22 X |
| 2,757,611 | 8/1956 | Church et al. | 102—24 |
| 2,946,283 | 7/1960 | Udry | 89—1 X |
| 3,018,752 | 1/1962 | Sorrell | 89—1 X |
| 3,036,542 | 5/1962 | Robinson | 89—1 |

BENJAMIN A. BORCHELT, *Primary Examiner.*

SAMUEL W. ENGLE, SAMUEL FEINBERG,
*Examiners.*